United States Patent Office 3,420,637
Patented Jan. 7, 1969

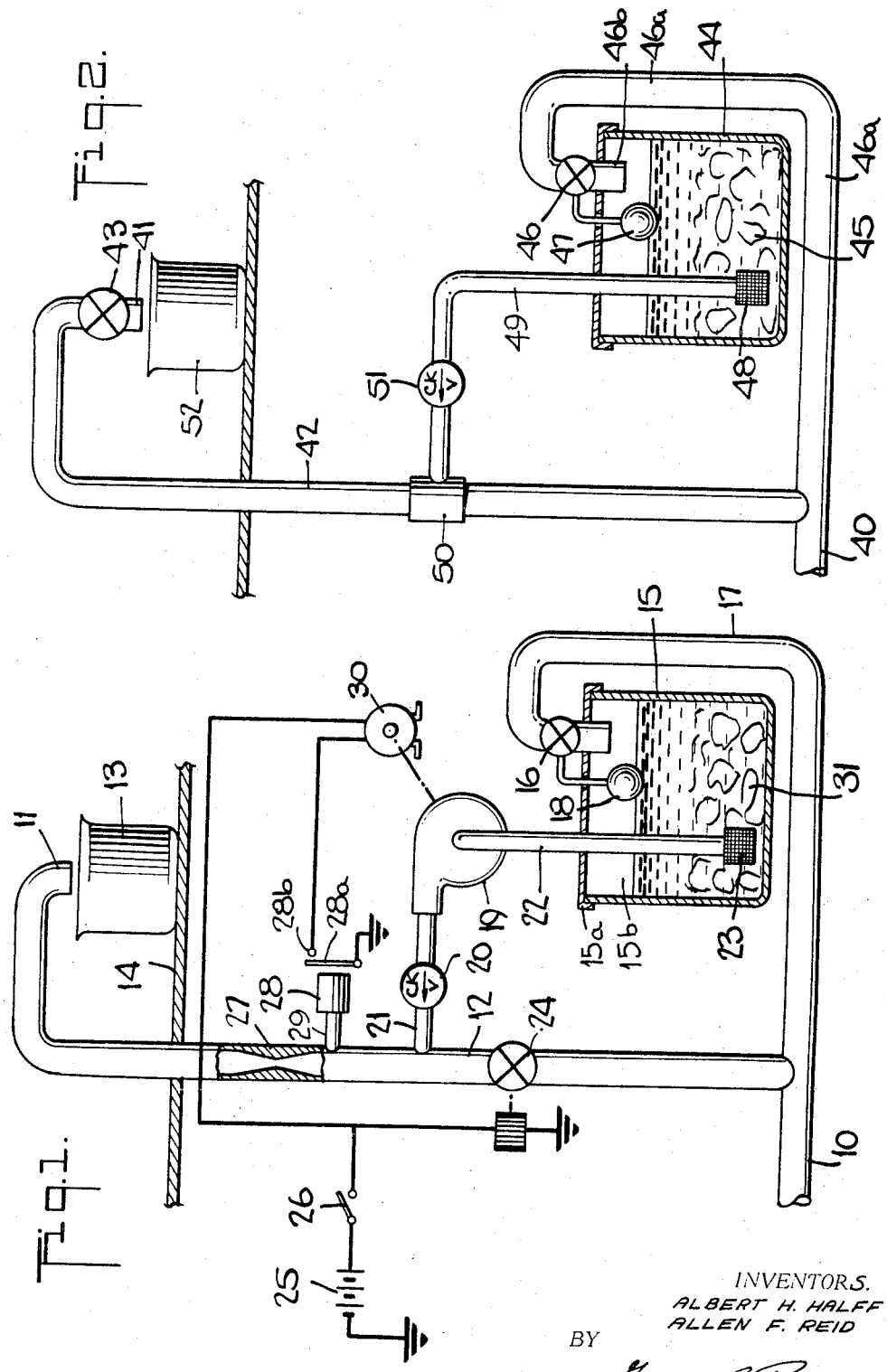

3,420,637
APPARATUS FOR FLUORIDATION OF WATER
Albert H. Halff, 3514 Rock Creek Drive, Dallas, Tex. 75204 and Allen F. Reid, Dallas, Tex. (258 Mill Spring Road, Manhasset, N.Y. 11030)
Filed Sept. 26, 1966, Ser. No. 581,780
U.S. Cl. 23—272.8   7 Claims
Int. Cl. C02b 7/00; B01d 11/00

ABSTRACT OF THE DISCLOSURE

A water main is fluoridated as the water is discharged by delivering from a reservoir metered amounts of saturated fluoridated water dependent on the flow of the main water. Means are provided to prevent the addition of fluoride compound when the flow of water drops below a given rate.

---

This invention is related to the fluoridation of water and is directed particularly to the control of fluoridation of the water at the place of use.

It is considered desirable by many health experts to maintain the fluoride concentration at appreciable levels in the drinking water, especially water consumed by children. Often the water system is fluoridated at its source. This is not always possible due to the expense of the equipment or to the objections of the users of the water. In order, therefore, to supply fluoridated water fluoridation units may be installed at the place where the water is being used. For example, fluoridation units may be placed in homes, schools or the like.

In the fluoridation of water at places of consumption it is necessary to control the fluoride content of the water so that excessive fluoride is not added to the water. Fluoridation should be prevented or stopped if the flow of water drops below a given pressure. Heretofore no fluoridation units have been provided that can increase the fluoride content of water at its place of use.

An object of the invention is to fluoridate water on supply to a source in response to demand with the concentration controlled by the solubility of the fluoride and the flow and pressure of the water.

Another object of the invention is to provide a fluoridation apparatus that supplies a fluoride to consumed water in response to the flow of the water with the concentration of the fluoride in the consumed water controlled by the solubility of the fluoride.

Another object of the invention is to provide a fluoridation apparatus connected to a water supply pipe that prevents the addition of fluoride on the dropping of the water pressure below a given value.

Other and further objects and advantages will be apparent from the following description taken in connection with the drawings in which FIG. 1 illustrates a fluoridation unit for supplying fluoride to water at a drinking fountain; and FIG. 2 illustrates a fluoridation apparatus similar to the one shown in FIG. 1 of a slighly simpler construction.

Referring to FIG. 1 water is supplied from the main pipe 10 to the discharge nozzle 11 through the pipe 12 for delivery to a receptacle 13, such as a glass or the like. The receptacle 13 rests on the horizontal support 14. The fluoridation unit has a container 15 with a protective top 15a covering the chamber 15b. The discharge end of the pipe 17 extends into the chamber 15b and supplies water to submerge the lumps of calcium fluoride 31. A valve 16 is mounted in the discharge or effluent end of the pipe 17 and the float 18 resting on the surface of the water is attached to the valve for controlling the supply of water to the container 15. Thus if the water is above a given level in the container 15, the valve 16 is closed.

The calcium fluoride in the container 15 is submerged in the water and dissolves to form a solution of calcium fluoride in water. The concentration is at a given valve and is higher than required for consumption. The water is then withdrawn from the container and is discharged into the pipe 12 through the valve 20 by the metering pump 19. The pump controls the amount of fluoride added to the prescribed proportions. The valve 20 prevents the reverse flow of water from the pipe 12 through the pipe 21 and the pump 19. The pump 19 is connected to the fluoridated water in the container 15 by the pipe 22 which has a screen 23 at the lower end of the pipe at the bottom of the container 15.

The flow of water in the pipe 12 is controlled by the cutoff valve 24 which is electrically operated by the battery 25 through the manual switch 26. On opening of the valve 24 the water passes through the pipe 12. The pipe has constricting means 27 to narrow the flow of water and create a back pressure. A pressure switch 28 is connected to the pipe 12 by tube 29 upstream from the constricting means 27. When water flows through the pipe 12 on opening of valve 24, the pressure of the water due to the constricting means 27 actuates the pressure switch 28 which closes contacts 28a, 28b. These contacts are connected to the electric motor 30 driving the metering pump 19. The pressure switch 28, motor 30 for the metering pump, the switch 26 and battery 25 are connected in series for supplying current.

The calcium fluoride is in lumps 31 and is constantly immersed in the water due to the operation of the valve 16 by the float 18. In view of the limited solubility of the calcium fluoride the water becomes quickly saturated with the calcium fluoride and may be promptly extracted by the pump 19. Thus as fast as the water flows into the container 15 it may be removed by the pump 19.

When the water pressure in the pipe 10 drops, the back pressure developed by the constricting means 27 will also be reduced. On reduction of the pressure below a given value the pressure switch 28 will open the contacts 28a, 28b and prevent the metering pump 19 from being driven by the motor 30. No fluoride is then supplied to the water, preventing concentrations above the prescribed amounts. The circuit fails safe on the disruption of the electrical supply, preventing the operation of the metering pump and the supply of fluoride.

In FIG. 2 another embodiment of the invention is illustrated in which the incoming water is supplied by the main conduit 40 to the discharge nozzle 41 through the pipe 42 and the valve 43. A container 44 has lumps of calcium fluoride 45 and is provided with water from the pipe 40 through the pipe 46a and the nozzle 46b and the valve 46. The valve 46 is operated by the float 47 and provides water to the container 44 when it drops below a given level. The fluoridated water is withdrawn through the screen 48 and the pipe 49 by the pump 50. Check valve 51 is provided in the pipe 49 to prevent reverse flow. The pump 50 is mounted on the pipe 42 and the water from the main supply conduit 40 flows therethrough, and pumps the fluoridated water through the pipe 49 into the pipe 42. The pump 50 is a water pressure-water flow operated pump. If the flow and pressure of the water from the pipe 40 drops below a desired value, then it ceases to pump the saturated fluoridated water from the container 44. The flow of water through the pipe 42 is controlled by the valve 43. Thus fluoridated water is supplied to a container or glass 52.

It is thus seen from the foregoing description that a process and apparatus have been developed utilizing components functioning in an ascertainable and consistent manner to control the addition of fluoride to water on use. The main portion of the water flows to discharge. A separated portion is divided from the main portion and delivered to a reservoir containing lumps of calcium fluoride to form a substantially saturated solution of calcium fluoride. This saturated solution is then metered to the main portion for creating a concentration of calcium fluoride within acceptable values, the concentration of the fluoridized water being based on the solubility of the calcium fluoride and the metering of the processed separated portion. The calcium fluoride is a naturally occurring non-toxic mineral. The natural solubility constants of the calcium fluoride are the primary control of the fluoride. The pressure and flow of water controls the addition of fluoride and none is added if the flow of water should drop below critical amounts or the electrical system should fail to operate. Thus the calcium fluoride added will always be below prescribed safe values for consumption.

Various modifications may be made in these embodiments without departing from the invention as set forth in the appended claims.

We claim:

1. Apparatus for fluoridation of water comprising a main conduit having outlet means and having means for dividing flowing water into a main portion for discharge and a separated portion for concentrated fluoridation and recombination with a flowing main portion, a reservoir for holding a water soluble fluoride compound in contactable relation with a separated portion, conduit means connected between said reservoir and said dividing means for delivering a separated portion of water to said reservoir for forming a substantially saturated solution of a fluoride compound, pressure means in said main conduit responsive to water flow, pump means connected between said reservoir and main conduit for delivering metered amounts of a substantially saturated separated portion, and electrical means having a pressure responsive switch connected to said pressure means and said pump means for energizing said pump means to deliver a substantially saturated separate portion at a given rate of flow and stopping said pump means on the rate of flow dropping below a given value to prevent excessive fluoridation.

2. Apparatus as set forth in claim 1 wherein said reservoir comprises a container for holding a water soluble fluoride compound in lump form for submersion in a separated portion to dissolve therein.

3. Apparatus as set forth in claim 2 wherein said conduit means has a valve with a float for opening and closing said valve depending on the level of the water in the reservoir.

4. Apparatus as set forth in claim 2 wherein and said pressure responsive switch has make and brake contacts for connecting said metering pump to an electrical source when a main portion flows at a given rate and pressure.

5. Apparatus as set forth in claim 4 wherein said pressure means is constriction means in said main conduit downstream from said pressure switch to create a fluid pressure on said switch.

6. Apparatus as set forth in claim 5 wherein said main conduit has a normally closed valve with electrical means for applying power to open said valve.

7. Apparatus for fluoridation of water comprising a main conduit having outlet means and having means for dividing flowing water into a main portion and a separated portion, a reservoir for holding a water soluble fluoride compound in contactable relation with a separated portion, conduit means connected to said dividing means for delivering a separated portion to said reservoir for forming a substantially saturated solution of a fluoride compound, suction creating means in said main conduit between said dividing means and said outlet means responsive to water flow, water carrying means connected between said suction creating means and said reservoir for drawing fluoridated water from said reservoir in metered amount proportional to main water flow for mixing a substantially saturated solution of a fluoride compound with the water flow in said main conduit discharged at said outlet means and said water carrying means having valve type means stopping the drawing of fluoridated water from said reservoir when the rate of flow drops below a given value to prevent excess fluoridation.

References Cited

UNITED STATES PATENTS

| | | | |
|---|---|---|---|
| 2,749,222 | 6/1956 | Munroe | 23—272 |
| 2,842,429 | 7/1958 | Easton et al. | 23—267 |
| 2,767,846 | 10/1956 | Schulse | 23—267 |
| 2,820,701 | 1/1958 | Leslie | 23—271 |
| 3,196,892 | 7/1965 | Savage et al. | 210—198 X |

FOREIGN PATENTS 1,303,023   7/1962   France.

OTHER REFERENCES

Betz: Handbook of Industrial Water Conditioning, 5th edition, 1957, Betz Laboratories, Inc., Philadelphia 24, Pa., pp. 80–87 relied on.

MICHAEL E. ROGERS, *Primary Examiner.*

U.S. Cl. X.R.

137—7, 101.11; 210—62, 101